United States Patent
Walrant et al.

(10) Patent No.: US 10,326,453 B2
(45) Date of Patent: Jun. 18, 2019

(54) MONOTONIC COUNTER AND METHOD OF OPERATING A MONOTONIC COUNTER

(71) Applicant: NXP B.V., Eindhoven (NL)

(72) Inventors: Thierry G. C. Walrant, Bouge (BE); Bernd Uwe Gerhard Elend, Hamburg (DE); Andreas Bening, Henstedt-Ulzburg (DE)

(73) Assignee: NXP B.V., Eindhoven (NL)

( * ) Notice: Subject to any disclaimer, the term of this patent is extended or adjusted under 35 U.S.C. 154(b) by 56 days.

(21) Appl. No.: 15/841,225

(22) Filed: Dec. 13, 2017

(65) Prior Publication Data
US 2018/0175864 A1    Jun. 21, 2018

(30) Foreign Application Priority Data

Dec. 14, 2016   (EP) ..................................... 16204188
Jan. 30, 2017   (EP) ..................................... 17153764

(51) Int. Cl.
*H03K 23/00*   (2006.01)
*G06F 21/57*   (2013.01)
(Continued)

(52) U.S. Cl.
CPC ....... *H03K 23/005* (2013.01); *G06F 9/44557* (2013.01); *G06F 21/577* (2013.01);
(Continued)

(58) Field of Classification Search
CPC .. H03K 23/005; H03K 21/406; H03K 21/403; H04L 63/1441; G06F 21/71; G06F 9/44557; G06F 21/577; G11C 16/349
(Continued)

(56) References Cited

U.S. PATENT DOCUMENTS

| | | | |
|---|---|---|---|
| 6,249,562 B1 * | 6/2001 | Wells | H03K 21/403 377/109 |
| 6,687,325 B1 * | 2/2004 | Wells | H03K 21/403 365/236 |

(Continued)

FOREIGN PATENT DOCUMENTS

| | | |
|---|---|---|
| CN | 101517598 B | 8/2009 |
| CN | 101807818 B | 8/2010 |

(Continued)

OTHER PUBLICATIONS

Sharma, S. et al. "An Efficient Distributed Group Key Management Using Hierarchical Approach with Elliptic Curve Cryptography", IEEE International Conference on Computational Intelligence & Communication Technology, Ghaziabad, pp. 687-693 (2015).

(Continued)

*Primary Examiner* — Ryan Jager
(74) *Attorney, Agent, or Firm* — Rajeev Madnawat

(57) ABSTRACT

The present application relates to a system hosting a monotonic counter and a method of operating the system. The system comprises a non-volatile memory (110) for holding a save counter value and a volatile memory (120) for maintaining a current counter value. The system (100) is configured during a startup phase to retrieve the saved counter value of the monotonic counter from the non-volatile memory (110); to detect whether a previous shutdown of the system (100) was an uncontrolled shutdown; and to adjust the retrieved counter value in accordance with a step size (130) provided at the system (100) in case an previous uncontrolled shutdown is detected.

13 Claims, 2 Drawing Sheets

(51) Int. Cl.
  G11C 16/34       (2006.01)
  G06F 21/71       (2013.01)
  G06F 9/445       (2018.01)
  H03K 21/40       (2006.01)
  H04L 29/06       (2006.01)

(52) U.S. Cl.
  CPC ............ *G06F 21/71* (2013.01); *G11C 16/349* (2013.01); *H03K 21/406* (2013.01); *H04L 63/1441* (2013.01); *H03K 21/403* (2013.01)

(58) Field of Classification Search
  USPC .......................................................... 377/37
  See application file for complete search history.

(56) References Cited

U.S. PATENT DOCUMENTS

| | | | | |
|---|---|---|---|---|
| 6,836,853 | B1* | 12/2004 | Dover ................ | H03K 21/403 377/107 |
| 7,043,581 | B1* | 5/2006 | Gulick ................ | G06F 21/71 710/104 |
| 8,027,609 | B2 | 9/2011 | Van Buren et al. | |
| 8,302,176 | B2 | 10/2012 | Huang | |
| 9,231,936 | B1 | 1/2016 | Wang et al. | |
| 2013/0145080 | A1* | 6/2013 | Grandin ............. | G06F 9/44505 711/103 |
| 2015/0089236 | A1 | 3/2015 | Han et al. | |
| 2016/0149908 | A1 | 5/2016 | Unagami et al. | |
| 2016/0180095 | A1* | 6/2016 | Sarangdhar ........... | G06F 21/575 713/2 |
| 2017/0034867 | A1* | 2/2017 | Oshida ................ | H04L 63/0428 |
| 2018/0373598 | A1* | 12/2018 | Mondello ........... | G06F 11/1458 |

FOREIGN PATENT DOCUMENTS

| | | |
|---|---|---|
| DE | 10 2012 219 079 A1 | 4/2014 |
| EP | 3 038 318 A1 | 6/2016 |
| WO | 2015125197 A1 | 8/2015 |

OTHER PUBLICATIONS

Mortazavi, S. A. et al. "An efficient distributed group key management using hierarchical approach with Diffie-Hellman and Symmetric Algorithm: DHSA", International Symposium on Computer Networks and Distributed Systems (CNDS), Tehran, pp. 49-54. (2011).

Adusumilli, P. et al. "DGKD: distributed group key distribution with authentication capability", Proceedings from the Sixth Annual IEEE SMC Information Assurance Workshop, pp. 286-293 (2005).

* cited by examiner

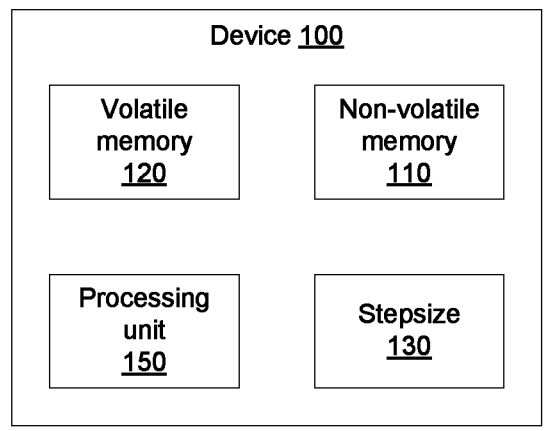
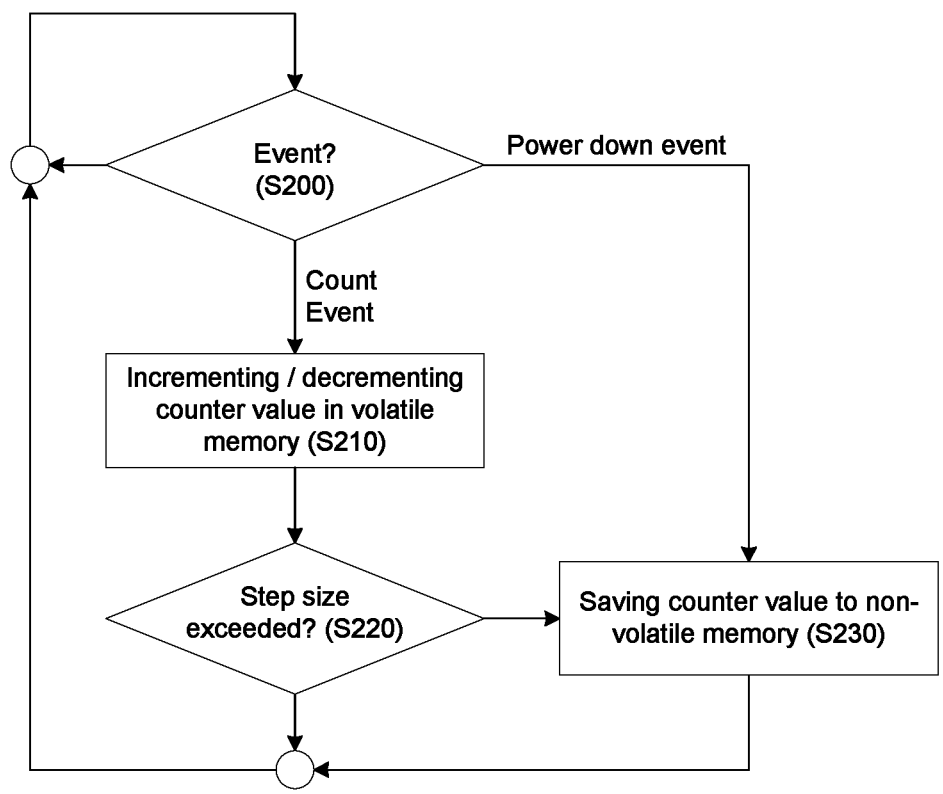
FIG. 1
FIG. 2

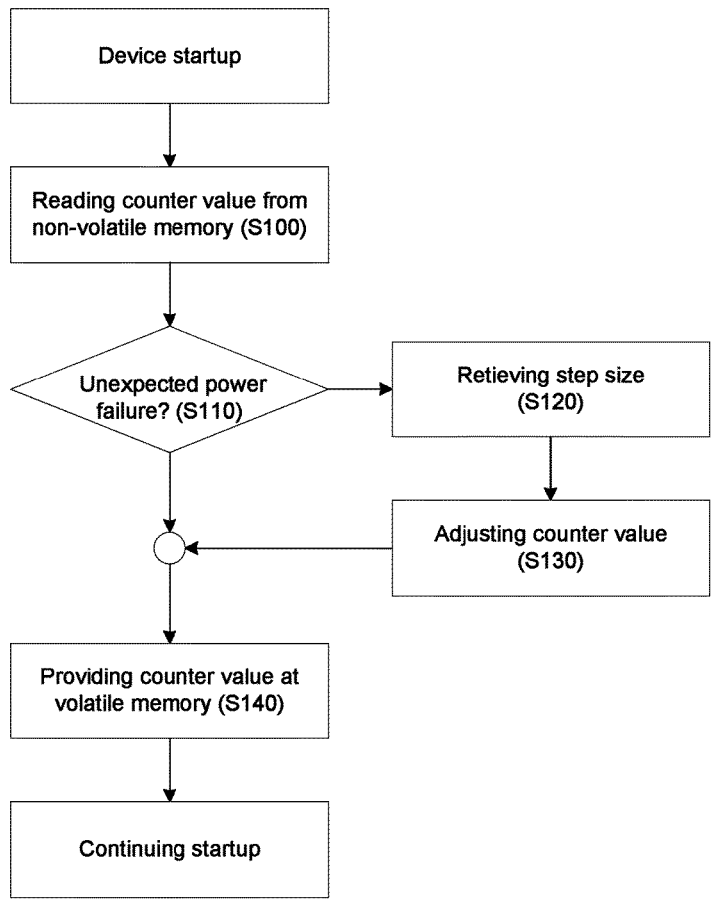
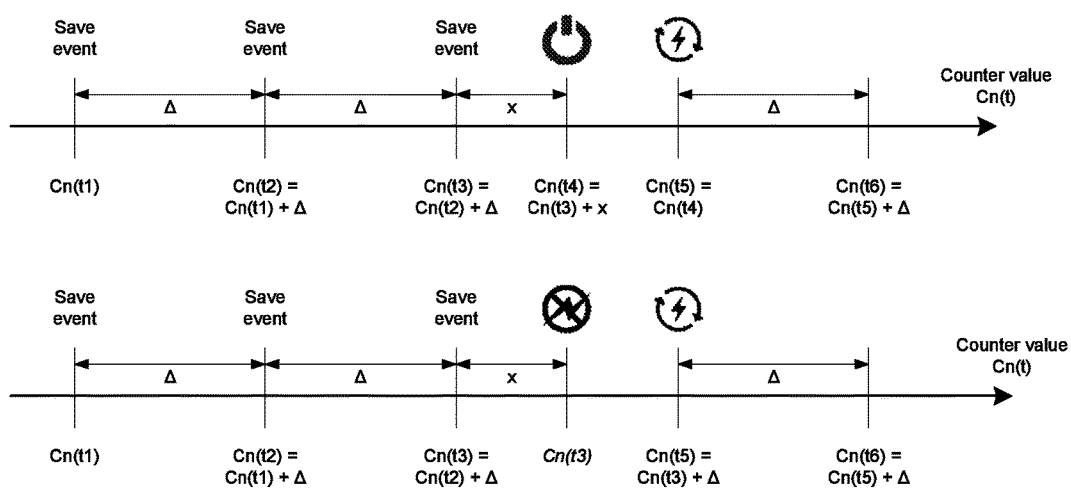
FIG. 4

MONOTONIC COUNTER AND METHOD OF OPERATING A MONOTONIC COUNTER

CROSS-REFERENCE TO RELATED APPLICATIONS

This application claims the priority under 35 U.S.C. § 119 of European Patent application no. 16204188.3, filed on Dec. 14, 2016, and European Patent application no. 17153764, filed on Jan. 30, 2017, the contents of which are incorporated by reference herein.

FIELD OF THE INVENTION

The present disclosure relates generally to a monotonic counter, in particular to a method of maintaining a monotonic counter in volatile memory and non-volatile memory.

BACKGROUND

Data security refers to the confidentiality, integrity, and/or availability of information that is stored or processed on the data processing platform. Data security addresses the need to reduce the vulnerability of information to malicious software and hardware based attacks. Data processing platforms therefore include physical and logical features to provide a secure execution. A monotonic counter may be included as part of the secure execution and may be used in combination with various authentication procedures to prevent user attacks including in particular replay attacks.

A monotonic counter is implemented to produce incrementing or decrementing values. For the incrementing values implementation, once the count value changes to a higher number, it should not thereafter exhibit any value less than the higher number. For the decrementing values implementation, once the count value changes to a lower number, it should not thereafter exhibit any value greater than the lower number. For either implementation, the monotonic nature of the count value should be maintained throughout the life of the device, in which the monotonic counter operates, including across any number of power-on and power-off cycles. Causing a monotonic counter to not maintain its count value and revert to an earlier value can result in a compromise in the device's security (referred to herein as a "replay attack").

Data processing platforms may utilize a non-volatile memory for storing boot instructions and pertaining parameters (e.g., basic input output system (BIOS) instructions). Flash memory device is commonly used as a storage for these instructions and parameters. Flash memory and in particular no-chip flash memory is an ideal candidate for storing monotonic counters. However, a limitation of flash memory is that flash memory has a finite number of program-erase cycles, which results to a limitation of the number of data write accesses to the flash memory.

The write cycles required to maintain the value of a monotonic counter, which is incremented/decremented at a high rate may exceed the finite number of program-erase cycles before the expected end of the live time of the device, which hosts the monotonic counter.

SUMMARY

The present invention provides a system hosting a monotonic counter and a method of operating a system hosting a monotonic counter as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

FIG. 1 schematically illustrates a block diagram of a system according to an example of the present invention;

FIG. 2 schematically illustrates a flow diagram of maintaining a monotonic counter value according to an example of the present invention;

FIG. 3 schematically illustrates a flow diagram of a startup procedure of system hosting a monotonic counter according to an example of the present invention; and FIG. 4 schematically illustrates time diagrams relating to the counter values of a monotonic counter according to an example of the present invention.

DETAILED DESCRIPTION

Embodiments of the present disclosure will be described below in detail with reference to drawings. Note that the same reference numerals are used to represent identical or equivalent elements in figures, and the description thereof will not be repeated. The embodiments set forth below represent the necessary information to enable those skilled in the art to practice the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Monotonic counters are for instance used for authenticated message comprising a message authentication code, which prevent replay attacks based on previous sent authenticated messages. The sender of an authenticated message generates the message authentication code on the basis of the value of the monotonic counter, which is for instance incremented/decremented in response to each sending event of authenticated messages. The receiver of such an authenticated message verifies that the value of the monotonic counter is a newer value than the last known counter value. The last known counter value is for instance the count value comprised used for the previous authenticated message. The monotonicity of the counter ensures that one counter value is used only once in the live time of the sender hosting the monotonic counter.

For instance, in case of a high message rate it is immediately understood that in case the value of the monotonic counter is maintained in flash memory, there is the risk that the guaranteed number of write cycles is exceeded before the expected/planed live time of the flash memory and hence also the device hosting the flash memory.

In order to overcome the problem of a limitation of the number of write cycles, the values of the monotonic counter is maintained in volatile memory 120 such as classic SRAM (static random access memory) or DRAM (dynamic random access memory) and is saved at defined point in times in the non-volatile memory 110 of the processor 150 based system 100 as schematically illustrated in form of a block diagram shown in FIG. 1.

Referring now to the flow diagram shown in FIG. 2, which illustrates a sequence of maintaining a monotonic counter value according to an embodiment of the present application.

The illustrated sequence is operable on a system illustrated with reference to FIG. 1 and described above with reference thereto. The system 100 maintains a current counter value in the volatile memory 120 and a saved counter value in the non-volatile memory 110. A step size 130 is configured at the system 100. The step size 130 is a constant value.

On a regular startup of the system 100, which means in the context of the present application that the system 100 but again into operation after a controlled shut-down, the current counter value is present in the volatile memory 120.

In a continuous process S200, it is checked whether events relating to the monotonic counter are present. Events relating to the monotonic counter comprises in particular counting events, e.g. in response to sending a data message, and power down events.

In case of a counting event being present, the value of the monotonic counter in the volatile memory is incremented or decremented in an operation S210 and in a following operation S220, it is checked whether or not the counter value has been changed by the predefined step size since the last saving of the counter value. For instance, the current counter value, which is the value of the monotonic counter maintained in the volatile memory 120, is compared to the saved counter value, which is the value of the monotonic counter saved in the non-volatile memory 110.

In case the difference between the current counter value and the saved counter value exceeds the predefined step size 130, the current value is saved to the non-volatile memory 110 thereby updating the saved counter value, in an operation S220. The sequence commences with the event detection process S200.

In case the difference between the current counter value and the saved counter value does not exceed the predefined step size 130, the sequence commences with the event detection process S200.

In case of a power down event being present, the current counter value is saved to the non-volatile memory 110 thereby updating the saved counter value, in the operation S220.

Those skilled in the art will understand that in case of an unexpected uncontrolled shutdown, the detection of the power down event and/or the updating of the saved counter value with the current counter value may fail. A controlled or proper shutdown of the system is recorded such that after powering up of the system, an indication at startup of the system is available indicating that the previous shutdown was a controlled or proper shutdown. For instance, the absence of such indication is indicative of a previous uncontrolled system shutdown.

Referring now to FIG. 3, a flow diagram shows a flow diagram relating to the startup procedure of the aforementioned system hosting a monotonic counter according to an embodiment of the present application. In particular, the flow diagram relates to the adjusting of the current value of a monotonic counter in case of a previous uncontrolled shutdown of the system hosting the monotonic counter. The system comprises an indication about the previous system shutdown, in particular an indication indicative of a previous controlled or uncontrolled system shutdown.

In an operation S100, which may part of the of a system startup sequence such as a system boot process, the saved value is read from the non-volatile memory 110. In case of a previous controlled system shutdown, the saved value of the monotonic counter present in the non-volatile memory is valid. In case of a previous uncontrolled system shutdown, the saved value of the monotonic counter in the non-volatile memory cannot be considered as valid since the current counter value is maintained in the volatile memory and saved in the non-volatile memory only regularly in accordance with the step size 130.

In an operation S110, it is checked whether or not the previous system shutdown was a controlled or uncontrolled system shutdown. In case of a detection of a previous uncontrolled system shutdown, the step size 130 is retrieved and the counter value read from the non-volatile memory 110 is adjusted according to the step size 130, in an operation S130. The adjusted counter value is saved to the non-volatile memory 110 and further provided in the volatile memory 120, in an operation S140. In case of a previous uncontrolled system shutdown, a counter value verification and potential adjustment is required.

In case of a detection of a previous controlled system shutdown, the counter value read from the non-volatile memory 110 is provided in the volatile memory 120, in an operation S140. In case of a previous controlled system shutdown, an adjustment of the counter value read from the non-volatile memory is not required.

Referring now to FIG. 4, saved counter values in the non-volatile memory 110 are schematically illustrated. The upper time diagram illustrates a controlled or proper system shutdown whereas the lower time diagram illustrated an uncontrolled system shutdown.

During operation of the system, the current counter value of the monotonic counter maintained in the non-volatile memory 120 is regularly saved to the non-volatile memory in accordance with the step size $\Delta$ referred to above as step size 130. For instance, at a time t1 the current counter value $Cn(t1)$ is saved to the non-volatile memory 120, at a time t2 the current counter value $Cn(t2)$ is saved to the non-volatile memory 120 and, at a time t2 the current counter value $Cn(t3)$ is saved to the non-volatile memory 120. It should be noted that the diagrams refer to an incrementing monotonic counter without limiting the present application thereto. Those skilled in the art understand that the suggested implementation of a monotonic counter is applicable to incrementing and decrementing monotonic counters.

In case that at the time t4, the system performs a controlled shutdown, the current counter value $Cn(t4)$ is saved to the non-volatile memory 120. At restart at time t5, the saved counter value in the non-volatile memory is valid and the monotonic counter commences to count from the saved counter value.

In case that at the time t4, the system undergoes an uncontrolled shutdown, the current counter value $Cn(t4)$ is not saved to the non-volatile memory 120. At restart at time t5, the saved counter value in the non-volatile memory is the last saved counter value $Cn(t3)$ valid at time t3 before time t4 of the uncontrolled shutdown. In order to ensure monotonicity of the monotonic counter, the counter value, from which the monotonic counter starts again at restart of the system at time t5, is adjusted. The step size $\Delta$ is added to the saved counter value present in the non-volatile memory at system restart at time t5 (the counter value $Cn(t3)$, e.g.) in case of an incrementing monotonic counter. The step size $\Delta$ is subtracted from the saved counter value present in the non-volatile memory at system restart at time t5 in case of a decrementing monotonic counter. The monotonic counter commences to count from the adjusted counter value.

Those skilled in the art immediately understand that adjustment of the saved counter value after restart of the system, which previously underwent an uncontrolled shutdown, is accompanied with a wasting of counter values, herein for instance |Δ−x| counter values. The wasting of counter values has to be considered when choosing an adequate step size, which can be estimated from the required range of the monotonic counter over the system live time, the maximum number of write cycles to handle the non-volatile memory live time, the number of expected controlled system shutdown events and the number of expected uncontrolled system shutdown events.

Those skilled in the art understand that the smaller the step size 130, the lower the number of "wasted" counter values but at the cost of a shortened live time of the non-volatile memory. The greater the step size 130, the higher the number of "wasted" counter values but with the effect of an extended live time of the non-volatile memory.

According to an example of the present application, a method of operating a system hosting a monotonic counter is provided. On startup of the system, a saved counter value of the monotonic counter is retrieved from a non-volatile memory of the system, it is detected whether a previous shutdown of the system was an uncontrolled shutdown; and the retrieved counter value is adjusted in accordance with a step size in case a previous uncontrolled shutdown is detected.

According to an example of the present application, a current counter value of the monotonic counter is maintained in a volatile memory, counter events are detected; and a counting operation on the current counter value is performed in response to a detected counter event. The current counter value is saved to the non-volatile memory in case a difference of the current counter value in the volatile memory and the saved counter value in the non-volatile memory exceed the step size.

According to an example of the present application, the current counter value is saved to the non-volatile memory in response to a detected shutdown event relating to a shutdown of the system.

According to an example of the present application, the step size is preconfigured. According to an example of the present application, the monotonic counter is a strict monotonic counter. According to an example of the present application, the step size is constant over the live time of the system.

According to an example of the present application, the performing the counting operation comprises incrementing the current value in case of the monotonic counter is an incrementing monotonic counter and decrementing the current value in case of the monotonic counter is a decrementing monotonic counter.

According to an example of the present application, a system hosting a monotonic counter is provided. The system comprises a non-volatile memory for holding a save counter value and a volatile memory for maintaining a current counter value, During a startup phase the system is configured to retrieve the saved counter value of the monotonic counter from the non-volatile memory; to detect whether a previous shutdown of the system was an uncontrolled shutdown; and to adjust the retrieved counter value in accordance with a step size provided at the system in case an previous uncontrolled shutdown is detected.

According to an example of the present application, the system is further configured to detect counter events; and perform a counting operation on the current counter value in response to a detected counter event. The current counter value is saved to the non-volatile memory in case a difference of the current counter value in the volatile memory and the saved counter value in the non-volatile memory exceed the step size.

According to an example of the present application, the system is further configured to save the current counter value to the non-volatile memory in response to a detected shutdown event relating to a shutdown of the system.

According to an example of the present application, the monotonic counter is a strict monotonic counter. According to an example of the present application, the step size (130) is constant over the live time of the system.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To illustrate clearly this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of operating a system hosting a monotonic counter, said method comprising:
   on startup of the system, retrieving a saved counter value of the monotonic counter from a non-volatile memory of the system.
   on startup of the system, detecting whether a previous shutdown of the system was an uncontrolled shutdown; and
   on startup of the system, adjusting the retrieved counter value in accordance with a step size in case a previous uncontrolled shutdown is detected.

2. The method according to claim 1, further comprising: maintaining a current counter value of the monotonic counter in a volatile memory, detecting counter events; performing a counting operation on the current counter value in response to a detected counter event; and
   saving the current counter value to the non-volatile memory in case a difference of the current counter value in the volatile memory and the saved counter value in the non-volatile memory exceed the step size.

3. The method according to claim 1, further comprising: saving the current counter value to the non-volatile memory in response to a detected shutdown event relating to a shutdown of the system.

4. The method according to claim 1, wherein the step size is preconfigured.

5. The method according to claim 1, wherein the monotonic counter is a strict monotonic counter.

6. The method according to claim 1, wherein performing a counting operation comprises incrementing the current value in case of the monotonic counter is an incrementing monotonic counter and decrementing the current value in case of the monotonic counter is a decrementing monotonic counter.

7. The method according to claim 1, wherein the step size is constant over the live time of the system.

8. method according to claim 1, wherein adjusting the retrieved counter value in accordance with a step size further comprises saving the adjusted counter value to the non-volatile memory.

9. A system hosting a monotonic counter, wherein the system comprises a non-volatile memory for holding a save counter value and a volatile memory for maintaining a current counter value, wherein the system is configured during a startup phase to
   retrieve the saved counter value of the monotonic counter from the non-volatile memory;
   detect whether a previous shutdown of the system was an uncontrolled shutdown; and
   to adjust the retrieved counter value in accordance with a step size provided at the system (100) in case a previous uncontrolled shutdown is detected.

10. The system according to claim 9, wherein the system is further configured to detect counter events;
   perform a counting operation on the current counter value in response to a detected counter event; and
   save the current counter value to the non-volatile memory in case a difference of the current counter value in the volatile memory and the saved counter value in the non-volatile memory exceed the step size.

11. The system according to claim 9, wherein the system is further configured to save the current counter value to the non-volatile memory in response to a detected shutdown event relating to a shutdown of the system.

12. The apparatus according to claim 9, wherein the monotonic counter is a strict monotonic counter.

13. The apparatus according to claim 9, wherein the step size lis constant over the live time of the system.

* * * * *